(12) United States Patent
Degand et al.

(10) Patent No.: US 6,489,028 B1
(45) Date of Patent: Dec. 3, 2002

(54) OPHTHALMIC LENS MADE OF ORGANIC GLASS WITH AN IMPACT-RESISTANT INTERLAYER, AND PROCESS FOR ITS MANUFACTURE

(75) Inventors: Jean-Pierre Degand, Paris (FR); Anne Robert, Creteil (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/354,712

(22) Filed: Jul. 16, 1999

Related U.S. Application Data

(63) Continuation of application No. PCT/FR98/02376, filed on Nov. 6, 1998.

(30) Foreign Application Priority Data

Nov. 18, 1997 (FR) .............................. 97 14445

(51) Int. Cl.⁷ .................... B32B 25/16; B32B 25/30; B32B 27/36; B32B 27/40; G02C 7/02
(52) U.S. Cl. .................... 428/423.1; 428/447; 428/451; 428/480; 428/521; 428/522; 428/908.8; 351/166
(58) Field of Search .......................... 361/166; 428/412, 428/480, 423.1, 519, 520, 521, 522, 908.8, 447, 451; 524/507, 513, 523, 525

(56) References Cited

U.S. PATENT DOCUMENTS

| | | | | |
|---|---|---|---|---|
| 5,015,523 A | * | 5/1991 | Kawashima et al. | 428/336 |
| 5,725,960 A | * | 3/1998 | Konishi et al. | 428/451 |
| 6,051,310 A | * | 4/2000 | Cano et al. | 428/336 |

FOREIGN PATENT DOCUMENTS

| | | |
|---|---|---|
| EP | B1 0119482 | 9/1984 |
| EP | B2 0463747 | 1/1992 |
| EP | B3 0580857 | 2/1994 |
| JP | B4 08054501 | 2/1996 |

OTHER PUBLICATIONS

Encyclopedia of Polymer Science and Engineering, vol. 1, pp. 472–475, Sep. 1985.*

* cited by examiner

Primary Examiner—Paul Thibodeau
Assistant Examiner—Ramsey Zacharia
(74) Attorney, Agent, or Firm—Fulbright & Jaworski L.L.P.

(57) ABSTRACT

The ophthalmic lens according to the invention includes a substrate made of organic glass, at least one abrasion-resistant coating and at least one primer layer inserted between the substrate and the abrasion-resistant coating, the impact-resistant primer layer being formed from a latex composition including at least one latex comprising butadiene units.

29 Claims, No Drawings

OPHTHALMIC LENS MADE OF ORGANIC GLASS WITH AN IMPACT-RESISTANT INTERLAYER, AND PROCESS FOR ITS MANUFACTURE

This application is a continuation of PCT Application No. PCT/FR98/02376 filed Nov. 6, 1998.

The present invention relates to an ophthalmic lens made of organic glass with an impact-resistant interlayer and to its process of manufacture.

Ophthalmic lenses made of organic glass are more sensitive to scratching and to abrasion than lenses made of inorganic glass.

It is known to protect the surface of lenses made of organic glass by means of hard coatings, generally based on polysiloxane.

It is also known to treat the lenses made of organic glass so as to prevent the formation of interfering reflections which are a nuisance for the wearer of the lens and for people to whom he or she is speaking. The lens is then provided with a single- or multilayer antireflective coating, generally made of inorganic material.

When the lens comprises an abrasion-resistant coating in its structure, the antireflective coating is deposited on the surface of the abrasion-resistant layer. Such a stacking reduces the impact strength, stiffening the system, which then becomes brittle. This problem is well known in the industry of ophthalmic lenses made of organic glass.

Thus, Japanese patents 63-141001 and 63-87223 describe lenses made of organic glass comprising an impact-resistant primer based on thermoplastic polyurethane resin. U.S. Pat. No. 5,015,523, for its part, recommends the use of acrylic impact-resistant primers, while European patent EP-040411 describes the use of impact-resistant primers based on heat-curable polyurethane.

None of the techniques described in the above patents makes it possible to combine high resistance to abrasion of the final lens and the absence or low content of organic solvent in the primer composition.

In addition, organic glasses which have increasingly high refractive indices have been employed in recent years for manufacturing ophthalmic lenses. As the refractive index increases, the lens thickness needed to obtain the same degree of correction has decreased. The resulting lenses are therefore thinner and lighter and consequently more attractive to the user.

These organic glasses with a higher refractive index tend, however, to be relatively soft and to scratch more easily. It is possible, of course, to coat these lenses with abrasion-resistant hard coatings, optionally with an interlayer of impact-resistant primer as previously, but the materials which were then recommended for forming these impact-resistant primers have turned out to be unsuitable for use with these new organic glasses of high refractive index.

Document EP-A-0680492 recommends the use of an impact-resistant primer layer formed from an aqueous dispersion of polyurethane applied directly to a surface of the organic glass substrate.

Although such primers are satisfactory, it would be desirable to find primer compositions which have enhanced impact strength properties while maintaining the abrasion resistance of the abrasion-resistant layer. In addition, it would also be desirable to have available materials for this impact-resistant primer layer enabling its index to be easily adapted to that of the organic glass substrate, in particular in the case of substrate made of organic glass of high refractive index.

The applicant company has just discovered, unexpectedly, that the use of latex compositions containing at least one latex including butadiene units makes it possible to obtain impact-resistant primer layers between a substrate made of organic glass and an abrasion-resistant coating, optionally coated with an antireflective coating, which have the desired properties of impact strength and the index of which can, if need be, be easily adapted to the refractive index of the organic glass without detriment to the abrasion resistance and antireflective properties of the abrasion-resistant and antireflective coatings.

The subject-matter of the present invention is therefore an ophthalmic lens including a substrate made of organic glass, at least one abrasion-resistant coating and at least one impact-resistant primer layer inserted between the organic glass and the abrasion-resistant coating, in which the impact-resistant primer layer is formed from a latex composition including at least one latex containing butadiene units.

Another subject-matter of the invention relates to a process for the manufacture of this lens.

In the present application a butadiene unit is intended to mean the butadiene unit properly so called $-(CH_2-CH=CH-CH_2)_n-$ as well as the isoprene unit

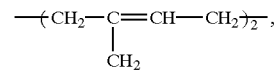

As is well known, latices are stable dispersions of a polymer in an aqueous medium.

The latex compositions of the present invention may consist solely of one or more latices comprising butadiene units. These compositions may also consist of one or more latices comprising butadiene units mixed with one or several other latices not comprising butadiene units.

The latices comprising butadiene units according to the invention are free from urethane functional groups.

Among the latices comprising butadiene units which are suitable for the latex compositions according to the present invention there may be mentioned natural (NR) or synthetic (IR) polyisoprene latices, polybutadiene (BR) latices, butadiene-styrene copolymer (SBR) latices, carboxylated butadiene-styrene copolymer (C-SBR) latices, butadiene-acrylonitrile copolymer (NBR) latices, carboxylated butadiene-acrylonitrile copolymers (C-NBR), latices of the ABS (acrylonitrile, butadiene, styrene) type, hydrogenated butadiene-acrylonitrile copolymer (H-NBR) latices, polychloroprene (CR) latices, isobutylene-isoprene copolymer (IIR) latices, halogenated, for example chlorinated or brominated, isobutylene-isoprene copolymer (XIIR) latices, and mixtures thereof.

The latices containing butadiene units which are recommended according to the present invention are polybutadiene, carboxylated butadiene styrene copolymer, carboxylated acrylonitrile-butadiene copolymer and polychloroprene latices.

The latex including the polybutadiene units preferably contains from 20 to 100% of polybutadiene.

Among the latices not comprising any butadiene units which are suitable for the latex compositions according to the invention there may be mentioned poly(meth)acrylic (ACM) latices, polyurethane latices and polyester latices.

Poly(meth)acrylic latices are latices of co-polymers consisting chiefly of a (meth)acrylate such as, for example, ethyl or butyl, or methoxy- or ethoxyethyl (meth)acrylate, with a generally minor proportion of at least one other comonomer, such as, for example, styrene.

The poly(meth)acrylic latices recommended in the latex compositions according to the invention are acrylate-styrene copolymer latices.

The latex compositions particularly recommended according to the invention are latex compositions comprising either solely a polybutadiene latex, a butadiene-styrene copolymer latex, a butadiene-acrylonitrile copolymer latex, a polychloroprene latex or a mixture of butadiene-styrene copolymer latex with a polyacrylic and/or polyurethane latex.

In the compositions containing a mixture of latices the solids content of the latex or latices not comprising any butadiene units may represent from 10 to 80%, preferably 10 to 60%, by weight of the solids content of the latices present in the composition.

The latex compositions according to the invention may comprise any ingredient conventionally employed in the primer layers for the adhesion of abrasion-resistant coating to ophthalmic lenses made of organic glass. In particular, they may include a crosslinking agent, an antioxidant, a UV absorber or a surface-active agent in the proportions conventionally employed.

Surface-active agents which may be employed are Baysilone OL 31 and FC 430 which are marketed by 3M, and Silwer LS 7657, L 7604 or L 77 from OSI Specialities.

The quantity of surface-active agent which is employed is generally from 0 to 1% by weight relative to the total weight of the latices present in the composition.

The quantity of crosslinking agent which is employed is generally from 0 to 5% by weight relative to the total weight of the latices present in the composition, preferably of the order of 3%.

The presence of a crosslinking agent makes it possible to avoid the possible appearance of crazing of hard varnish subsequently applied to the primer.

A recommended crosslinking agent is an aziridine derivative marketed under the name CX 100 by Zeneca Resins.

It is particularly desirable to include an antioxidant and/or a UV absorber in the latex compositions according to the invention, in proportions, for each of these agents, varying from 0 to 10% by weight of active substance, preferably from 0 to 5% by weight, and better still of the order of 2.5% by weight.

The antioxidant and the UV absorber are chosen to be soluble or easily dispersible in aqueous solution. The antioxidant is preferably introduced into the latex in the form of an aqueous dispersion.

Phenolic antioxidants, which have been found remarkably effective for the primers of the invention, are more particularly employed.

An example of such an antioxidant type is Irganox DW 245, marketed by Ciba. This is triethylene glycol bis-3-(3-tert-butyl-4-hydroxy-5-methylphenyl)propionate, in aqueous solution.

A UV absorber of benzimidazole type will be preferably employed as UV absorber, and preferably of the type comprising a sulphonate functional group.

As an example of such a UV absorber there may be mentioned Parsol HS, which is the sodium salt of the following sulphonic acid

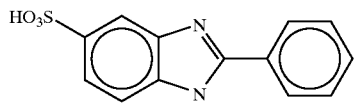

marketed by Givendon-Roure.

The combined presence of an antioxidant and of a UV absorber in the primer layer is advantageous, because it makes it possible to improve remarkably the total adhesiveness of the abrasion-resistant coating when dry. Thus, when the primer layer comprises such an antioxidant and UV absorber combination, the total adhesiveness of the abrasion-resistant coating when dry is retained even after 200 hours of sunlight exposure, which is not the case when the primer layer does not comprise any anti-oxidant.

The Irganox DW 245 and Parsol HS combination is particularly preferred.

The substrates of the lenses in accordance with the present invention are all substrates made of organic glass and commonly employed for organic ophthalmic lenses.

Among the substrates which are suitable for the lenses according to the invention there may be mentioned susbtrates obtained by-polymerization of alkyl (meth)acrylates, in particular $C_1$–$C_4$ alkyl (meth)acrylates, such as methyl (meth)acrylate and ethyl (meth)acrylate, allyl derivatives such as linear or branched, aliphatic or aromatic polyol allyl carbonates, thio(meth)acrylics, thiourethanes, and polyethoxylated aromatic (meth)acrylates such as polyethoxylated bisphenol A dimethacrylates.

Among the recommended substrates there may be mentioned substrates obtained by polymerization of polyol allyl carbonates, among which may be mentioned ethylene glycol bisallyl carbonate, diethylene glycol bis-2-methyl carbonate, diethylene glycol bis(allyl carbonate), ethylene glycol bis (2-chloroallyl carbonate), triethylene glycol bis(allyl carbonate), 1, 3-propanediol bis(allyl carbonate), propylene glycol bis(2-ethylallyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate) and isopropylene bisphenol A bis(allyl carbonate).

The substrates which are particularly recommended are the substrates obtained by polymerization of diethylene glycol bisallyl carbonate, sold under the trade name CR39® allyl diglycol carbonate by PPG Industrie (Essilor ORMA® lens).

Among the substrates which are also recommended there may be mentioned the substrates obtained by polymerization of thio(meth)acrylic monomers, such as those described in French patent application FR-A-2 734 827.

Obviously, the substrates may be obtained by polymerization of mixtures of the above monomers.

The abrasion-resistant coatings of the ophthalmic lenses according to the invention may be any abrasion-resistant coatings which are known in the field of ophthalmic optics.

Among the abrasion-resistant coatings recommended in the present invention there may be mentioned the coatings obtained from compositions based on silane hydrolysate, in particular epoxysilane hydrolysate, and compositions based on acrylic derivatives, such as those described in French patent application No. 93 026 49.

The abrasion-resistant coating preferably includes a UV absorber in proportions of 0 to 10%, preferably of 0 to 5%, and better still of the order of 1% relative to the total weight of the composition of the abrasion-resistant coating.

The presence of such a UV absorber in the abrasion-resistant coating together with the presence of an antioxidant and/or a UV absorber in the inserted impact-resistant primer layer increases the scratch resistance of the lens obtained.

As indicated above, the ophthalmic lens according to the invention may additionally comprise an antireflective coating deposited on the abrasion-resistant coating.

To give an example, the antireflective coating may consist of a single- or multilayer film, of di-electric materials such as SiO, $SiO_2$, $Si_3N_4$, $TiO_2$, $ZrO_2$, $Al_2O_3$, $MgF_2$ or $Ta_2O_5$, or mixtures thereof. It thus becomes possible to prevent the appearance of the reflection at the lens-air interface.

This antireflective coating is generally applied by vacuum deposition according to one of the following techniques:

1. By evaporation, optionally assisted by an ion beam.
2. By ion beam sputtering.
3. By cathodic sputtering.
4. By plasma-assisted vapour phase chemical deposition.

Besides the vacuum deposition it is also possible to envisage a deposition of an inorganic layer by a sol/gel route (for example starting from tetraethoxy-silane hydrolysates).

In the case where the film includes a single layer, its optical thickness must be equal to $\lambda/4$ where $\lambda$ is a wavelength between 450 and 650 nm.

In the case of a multilayer film comprising three layers it is possible to employ a combination corresponding to respective optical thicknesses $\lambda/4$-$\lambda/2$-$\lambda/4$ or $\lambda/4$-$\lambda/4$-$\lambda/4$.

It is possible in addition to employ an equivalent film formed by more layers, instead of any one of the layers forming part of the abovementioned three layers.

The ophthalmic lenses according to the invention may consist of a substrate made of organic glass coated on its rear face or its front face with an interlayer of impact-resistant primer according to the invention, with an abrasion-resistant coating deposited on the primer layer and optionally with an antireflective coating on the abrasion-resistant layer.

The substrate may also be coated on both its faces with a layer of impact-resistant primer according to the invention, an abrasion-resistant coating and optionally with an antireflective coating.

The ophthalmic lenses according to the invention preferably comprise a stack of the impact-resistant primer layer, of abrasion-resistant coating and optionally of antireflective coating on the rear face of the substrate or on both faces of the substrate.

The preferred ophthalmic lenses according to the invention comprise a single impact-resistant primer layer deposited on the rear face of the lens and, on each of the faces, an abrasion-resistant coating and an anti-reflective coating applied onto the abrasion-resistant coating.

For example, such a lens is obtained by depositing the primer layer by centrifuging on the rear face of the lens. Then, after drying this layer, the hard coating is applied by dip coating on both faces of the lens. Finally, after curing of this hard coating, an anti-reflective coating is applied on both faces of the lens.

An ophthalmic lens thus obtained has an excellent abrasion resistance on its front face, the one more stressed when the user is handling his or her glasses.

According to the present invention the thickness of the impact-resistant primer layer obtained after drying is preferably between 0.2 and 1 $\mu$m and more particularly between 0.4 and 0.8 $\mu$m.

The thickness of the abrasion-resistant coating, for its part, is generally between 1 and 10 $\mu$m and more particularly between 2 and 6 $\mu$m.

Another subject-matter of the present invention is therefore also a process for the manufacture of a lens including a substrate made of organic glass, at least one abrasion-resistant coating, optionally covered with an antireflective coating, and at least one impact-resistant primer layer inserted between the substrate and the abrasion-resistant coating, the process including:

the deposition on at least one face of the substrate, for example by centrifuging, of a layer of a latex composition as defined above;

the drying of this latex composition to form the impact-resistant primer layer(s);

the deposition of an abrasion-resistant hard coating on the impact-resistant primer layer(s) formed; and, optionally, the deposition of an antireflective coating on the abrasion-resistant hard coating(s).

The conditions of drying and curing of the layer can be determined by a person skilled in the art.

For example, a drying operation may be performed by heating to temperatures that can vary generally from 90° C. to 140° C. for a period varying, for example, from 1 hour to a few minutes.

The following examples illustrate the present invention.

In the examples, all the percentages and parts are expressed by weight, unless indicated otherwise.

COMPARATIVE EXAMPLE A and EXAMPLES 1 to 16

The latex compositions indicated in Table I below are deposited on substrates made of organic glass Orma® made of CR39® from Essilor, by centrifuging, after dilution in 50% of water.

TABLE 1

| Latex composition No. | Latex 1 | Chemical nature | Latex 2 (latex 3) | Mass proportion (%) Solids content of latex 2 Solids content of latex 3 | Crosslinker |
| --- | --- | --- | --- | --- | --- |
| 1 | Europrene 5587 ® | C-SBR (1) | — | — | — |
| 2 | Europrene 5587 ® | C-SBR | A639 (3) | 18.4 | — |
| 3 | Europrene 8487 ® | C-SBR | — | — | — |
| 4 | Europrene 8487 ® | C-SBR | — | — | CX100 (4) |
| 5 | Europrene 8487 ® | C-SBR | A639 | 18.4 | — |
| 6 | Baystal T 425C ® | C-SBR | A639 | 9 | — |
| 7 | Baystal T 425C ® | C-SBR | A639 | 9 | CX100 |

TABLE 1-continued

| Latex com-position No. | Latex 1 | Chemical nature | Latex 2 (latex 3) | Mass proportion (%) Solids content of latex 2 Solids content of latex 3 | Cross-linker |
|---|---|---|---|---|---|
| 8 | Butanol LS 170K ® | C-SBR | A639 | 43.6 | CX100 |
| 9 | Butanol LS 170K ® | C-SBR | A639 | 75.6 | CX100 |
| 10 | Europrene 2621 ® | C-NBR (2) | — | — | — |
| 11 | Europrene 2621 ® | C-NBR | — | — | CX100 |
| 12 | Europrene 2621 ® | C-NBR | A639 | 18.4 | — |
| 13 | Perbunan N latex VT ® | C-NBR | A639 | 9 | — |
| 14 | Perbunan N latex VT ® | C-NBR | A639 | 9 | CX100 |
| 15 | Baypren T ® | polychloroprene | A639 | 44 | CX100 |
| 16 | Baypren T ® | polychloroprene | A639 (R961) | 33 (25) | CX100 |

(1) C-SBR = styrene/butadiene copolymer containing carboxyl groups.
(2) C-NBR = acrylonitrile/butadiene copolymr containing carboxyl groups.
(3) (A639) polyacrylic latex marketed by Zeneca (acrylic/styrene), (solids content 45%).
(4) Mass proportion of CX100, aziridine derivative, marketed by Zeneca Resins, is the same in all the formulations containing it: 3%.
(5) (R961) polyurethane latex Neorez R961 from Zeneca (solids content 34%).

The compositions and some of the properties of the latices employed in the compositions in Table I are shown in Table II below.

TABLE II

| Designation | Type (supplier) | Composition | pH | % solids content | Viscosity (mPa s) | Tg (° C.) |
|---|---|---|---|---|---|---|
| Europrene ® 5587 | Carboxylated styrene/butadiene (Enichem) | 75% styrene | 8.0 | 50 | 500 | 48 |
| Europrene ® 8487 | Carboxylated SBR (Enichem) | 65% styrene | 8.5 | 50 | 500 | +8 +48 |
| Europrene ® 2621 | Carboxylated acrylonitrile/ butadiene (Enichem) | 30% acrylo-nitrile | 8.0 | 49 | 100 | −29 |
| Baystal T ® 425C | Carboxylated SBR (Bayer) | 55% styrene | 9.0 | 50 | 140 | −8 |
| Perbunan ® N latex VT | Carboxylated NBR (Bayer) | 30% acrylo-nitrile | 8.5 | 50 | 50 | −25 |
| Butonal ® LS 170 K | Carboxylated SBR (BASF) | 56% styrene | 3 | 58 | 400 | −55 |
| Baypren T ® | Polychloroprene (Bayer) | | 13.3 | 57.5 | 117 | −41 |

The deposition of the primer layer is performed on the rear face of the ophthalmic lenses by centrifuging.

The centrifuging conditions were determined to obtain an impact-resistant primer layer thickness of approximately 1 μm. The speed of rotation of the centrifuge was thus between 1500 and 2000 revolutions/minute and the period for which this speed was maintained was 15 seconds.

The deposits were next dried for 1 minute by entrainment in vapour phase by means of a Fluorinert FC 3283 fluid from 3M, which had a boiling temperature of 128° C., to produce the impact-resistant primer layers according to the invention.

After approximately 15 minutes' cooling, an abrasion-resistant coating was deposited on the faces of each of the lenses by dip coating and conventional curing.

The abrasion-resistant coating composition was prepared by adding 80.5 parts of 0.1N hydrochloric acid dropwise to a solution containing 224 parts of 1γ-glycidoxypropyltrimethoxysilane (GLYMO) and 120 parts of dimethylethoxysilane (DMDES).

The hydrolysed solution was stirred for 24 hours at ambient temperature and 718 parts of a dispersion containing 30% of colloidal silica in methanol, 15 parts of aluminium acetylacetonate and 44 parts of ethyl cellosolve were then added. A small quantity of the surface-active agent was added.

The theoretical solids content of the composition was of the order of 13% of solid, based on the hydrolysed DMDES.

This solution was deposited by dip coating and then precured for 15 minutes at 60° C. The substrate coated with this abrasion-resistant coating was next placed in an oven at 100° for 3 hours to obtain an abrasion-resistant coating with a thickness of 3.5 μm.

The lenses coated with the impact-resistant primer layer and the abrasion-resistant coating were next subjected to an antireflective treatment by vacuum evaporation. The antireflective treatment is deposited on both faces of each lens. The antireflective coating on the abrasion-resistant coating was obtained by a vacuum deposition:

of a first layer based on zirconium and titanium oxide;
of a second layer based on $SiO_2$; the optical thickness for these two layers taken as a whole being close to λ/4;

of a third layer based on TiO$_2$, of optical thickness $\lambda/2$, of a fourth layer based on SiO$_2$, of optical thickness $\lambda/4$.

The abrasion resistance was evaluated by determination of the Bayer value on substrates coated solely with the impact-resistant primer layer and the abrasion-resistant coating. The determination of this Bayer value was established in accordance with ASTM standard F 735.81.

The impact strength of the ophthalmic lenses obtained was determined on the substrates coated with the primer layer, the abrasion-resistant coating layer and the antireflective layer in accordance with the ball-drop test. In this test balls are allowed to fall with an increasing energy at the centre of the coated glass until the latter becomes starcracked or breaks. The minimum energy applied during this test is 15.2 g/metre (corresponding to the initial drop height). The mean energy of rupture of the coated substrate is then calculated.

The results are given in Table III below.

By way of comparison (Comparative Example A), ophthalmic lenses were produced including substrates and abrasion-resistant and antireflective coatings similar to those of the preceding examples, but comprising an impact-resistant primer layer with a thickness of 1 μm, obtained by centrifuging and drying a Neorez R961® commercial polyurethane latex from Zeneca. The impact-resistant primer layer was obtained by centrifuging at 2000 revolutions/minute for 10 seconds and then heating for 15 minutes at 100° C.

The abrasion resistance and impact resistance results are shown in Table III below.

TABLE III

| Latex composition No. | Chemical nature (mass proportions of the various latices) | Number of glasses tested (impact) | Centre thickness of the glasses (mm) | Energy of rupture (mJ) | Bayer |
|---|---|---|---|---|---|
| 1 (E5587) | C-SBR | 20 | 2.07 | 640 | 3.4 |
| 2 (E5587) | C-SBR/A639 (80/20) | 19 | 2.05 | 550 | 3.0 |
| 3 (E8487) | C-SBR | 58 | 2.01 | 750 | 3.3 |
| 4 (E8467) | C-SBR/CX100 | 19 | 2.07 | 545 | |
| 5 (E8487) | C-SBR/A639 (80/20) | 19 | 2.03 | 540 | |
| 6 (Baystal ®) | C-SBR/A639 (90/10) | 25 | 1.96 | 890 | 2.6 |
| 7 (Baystal ®) | C-SBR/A639 (90/10) CX100 | 20 | 2.12 | 1520 | 2.5 |
| 8 (Butonal ®) | C-SBR/A639 (50/50) CX100 | 18 | 2.02 | 1050 | 3.4 |
| 9 (Butonal ®) | C-SBR/A639 (20/60) CX100 | 18 | 2.03 | 740 | 3.6 |
| 10 (E2621) | C-NBR | 79 | 2.03 | 1240 | 3.4 |
| 11 (E2621) | C-NBR/CX100 | 36 | 2.06 | 870 | |
| 12 (E2621) | C-NBR/A639 (80/20) | 36 | 2.02 | 1000 | 2.7 |
| 13 (Perbunan ®) | C-NBR/A639 (90/10) | 27 | 2.05 | 1120 | 2.8 |
| 14 (Perbunan ®) | C-NBR/A639 (90/10) CX100 | 20 | 2.14 | 1025 | |
| 15 (Baypren ®) | Polychloroprene/A639 | 19 | 2.03 | 590 | 2.9 |
| 16 (Baypren ®) | Polychloroprene/A639/R961 (33.3/33.3/33.3) CX100 | 40 | 2.03 | 1030 | 3.0 |
| Comparative A Neorez ® R961 | Polyurethane (Zeneca) | | 2.04 | 490 | 4.5 |

The results in Table III show that the use of the latex compositions according to the invention to form the impact-resistant primer layers of ophthalmic lenses produces ophthalmic lenses which have energies of rupture that are appreciably increased in relation to an impact-resistant primer layer formed from a latex of the prior art, while retaining excellent abrasion resistances.

It will be noted in particular that the latices with high contents of butadiene units produce impact-resistant primer layers which are particularly resistant to impact, as also do latex compositions including a polyacrylic latex or a polyacrylic latex and a polyurethane latex.

What is claimed is:

1. An ophthalmic lens comprising a substrate comprising organic glass, at least one silane hydrolysate based abrasion-resistant coating and at least one impact-resistant primer layer positioned between the organic glass substrate and the abrasion-resistant coating, wherein the impact resistant primer layer is in direct contact with the abrasion-resistant coating, and wherein the impact-resistant primer layer comprises a latex composition which comprises at least one latex comprising butadiene units and is free of urethane functional groups, the at least one latex selected from the groups consisting of latexes of natural or synthetic polyisoprene, polybutadiene, butadiene-styrene copolymers, carboxylated butadiene-styrene copolymers, butadiene-acrylonitrile copolymers, carboxylated butadiene-acrylonitrile copolymers, acrylonitrile-butadiene-styrene copolymers, polychloroprene, isobutylene-isoprene copolymers, halogenated isobutyl-ene-isoprene copolymers and mixtures thereof.

2. The ophthalmic lens of claim 1, wherein the latex composition further comprises one or more latices that do not comprise butadiene units.

3. The ophthalmic lens of claim 2, characterized in that the one or more latices that do not containing butadiene units are chosen from the group consisting of polyacrylic latices, polymethacrylic latices, polyurethane latices and polyester latices.

4. The ophthalmic lens of claim 2, comprising a solid content of the latices not containing any butadiene units that is from 10 to 80% by weight of the solid content of the latices present in the latex composition which comprises at least one latex comprising butadiene units.

5. The ophthalmic lens of claim 4, comprising a solid content of the latices not containing any butadiene units that is from 10 to 60% by weight of the solid content of the latices present in the latex composition which comprises at least one latex comprising butadiene units.

6. The ophthalmic lens of claim 1, wherein the latex composition further comprises at least one crosslinking agent.

7. The ophthalmic lens of claim 1, wherein the latex composition further comprises at least one antioxidant.

8. The ophthalmic lens of claim 7, wherein the antioxidant is an aqueous dispersion.

9. The ophthalmic lens of claim 1, further defined as having a single layer of primer on a front face or a rear face of the substrate.

10. The ophthalmic lens of claim 9, wherein the single layer of primer is on the rear face of the substrate.

11. The ophthalmic lens of claim 9, further defined as comprising an abrasion-resistant coating on both the front face and the rear face of the lens.

12. The ophthalmic lens of claim 11, further comprising an antireflective coating on both the front face and the rear face of the lens.

13. The ophthalmic lens of claim 1, further defined as comprising a primer layer and an abrasion-resistant layer on a front face of the lens and on a rear face of the lens.

14. The ophthalmic lens of claim 13, further comprising an antireflective coating.

15. The ophthalmic lens of claim 1, further comprising an antireflective coating.

16. An ophthalmic lens comprising a substrate comprising organic glass, at least one abrasion-resistant coating and at least one impact-resistant primer layer positioned between the organic glass substrate and the abrasion-resistant coating, wherein the impact-resistant primer layer comprises a latex composition which comprises at least one latex comprising butadiene units and is free of urethane functional groups, the at least one latex selected from the groups consisting of latexes of natural or synthetic polyisoprene, polybutadiene, butadiene-styrene copolymers, carboxylated butadiene-styrene copolymers, butadiene-acrylonitrile copolymers, carboxylated butadiene-acrylonitrile copolymers, acrylonitrile-butadiene-styrene copolymers, hydrogenated butadiene-acrylonitrile copolymers, polychloroprene, isobutylene-isoprene copolymers, halogenated isobutyl-ene-isoprene copolymers and mixtures thereof, and wherein the latex composition further comprises one or more latices that do not comprise butadiene units.

17. The ophthalmic lens of claim 16, characterized in that the one or more latices that do not containing butadiene units are chosen from the group consisting of polyacrylic latices, polymethacrylic latices, polyurethane latices and polyester latices.

18. The ophthalmic lens of claim 16, comprising a solid content of the latices not containing any butadiene units that is from 10 to 80% by weight of the solid content of the latices present in the latex composition which comprises at least one latex comprising butadiene units.

19. The ophthalmic lens of claim 18, comprising a solid content of the latices not containing any butadiene units that is from 10 to 60% by weight of the solid content of the latices present in the latex composition which comprises at least one latex comprising butadiene units.

20. The ophthalmic lens of claim 16, wherein the latex composition further comprises at least one crosslinking agent.

21. The ophthalmic lens of claim 16, wherein the latex composition further comprises at least one antioxidant.

22. The ophthalmic lens of claim 21, wherein the antioxidant is an aqueous dispersion.

23. The ophthalmic lens of claim 16, further defined as having a single layer of primer on a front face or a rear face of the substrate.

24. The ophthamic lens of claim 23, wherein the single layer of primer is on the rear face of the substrate.

25. The ophthalmic lens of claim 23, further defined as comprising an abrasion-resistant coating on both the front face and the rear face of the lens.

26. The ophthalmic lens of claim 25, further comprising an antireflective coating on both the front face and the rear face of the lens.

27. The ophthalmic lens of claim 16, further defined as comprising a primer layer and an abrasion-resistant layer on a front face of the lens and on a rear face of the lens.

28. The ophthalmic lens of claim 27, further comprising an antireflective coating.

29. The ophthalmic lens of claim 16, further comprising an antireflective coating.

* * * * *